US010737322B2

(12) United States Patent
Yang et al.

(10) Patent No.: US 10,737,322 B2
(45) Date of Patent: Aug. 11, 2020

(54) COMPOSITE TANTALUM POWDER AND PROCESS FOR PREPARING THE SAME AND CAPACITOR ANODE PREPARED FROM THE TANTALUM POWDER

(71) Applicants: NINGXIA ORIENT TANTALUM INDUSTRY CO., LTD., Ningxia (CN); NATIONAL ENGINEERING RESEARCH CENTER FOR SPECIAL METAL MATERIALS OF TANTALUM AND NIOBIUM, Shizuishan, Ningxia (CN)

(72) Inventors: Guoqi Yang, Ningxia (CN); Aiguo Zheng, Ningxia (CN); Yuezhong Ma, Ningxia (CN)

(73) Assignees: Ningzia Orient Tanatum Industry Co., Ltd., Ningxia (CN); National Engineering Research Center for Special Metal Materials of Tantalim and Niobium, Ningxia (CN)

( * ) Notice: Subject to any disclaimer, the term of this patent is extended or adjusted under 35 U.S.C. 154(b) by 468 days.

(21) Appl. No.: 15/501,409

(22) PCT Filed: Aug. 20, 2014

(86) PCT No.: PCT/CN2014/084757
§ 371 (c)(1),
(2) Date: Feb. 2, 2017

(87) PCT Pub. No.: WO2016/026092
PCT Pub. Date: Feb. 25, 2016

(65) Prior Publication Data
US 2017/0232509 A1 Aug. 17, 2017

(51) Int. Cl.
*B22F 1/00* (2006.01)
*B22F 9/02* (2006.01)
(Continued)

(52) U.S. Cl.
CPC ............. *B22F 1/0055* (2013.01); *B22F 1/00* (2013.01); *B22F 1/0085* (2013.01);
(Continued)

(58) Field of Classification Search
CPC ........ B22F 1/0055; B22F 9/22; B22F 1/0088; B22F 9/04; B22F 1/0096; B22F 1/0085;
(Continued)

(56) References Cited

U.S. PATENT DOCUMENTS 3,647,415 A   3/1972  Yano et al.
4,141,719 A * 2/1979  Hakko ................... B22F 9/023
                                           361/529

(Continued)

FOREIGN PATENT DOCUMENTS

CN         1247576      3/2000
CN       101714461      5/2010
(Continued)

OTHER PUBLICATIONS

Supplementary European Search Report EP Application No. 14900092 dated Mar. 12, 2018.
(Continued)

*Primary Examiner* — Anthony J Zimmer
(74) *Attorney, Agent, or Firm* — Pillsbury Winthrop Shaw Pittman LLP

(57) ABSTRACT

The present invention relates to a composite tantalum powder and a process for preparing the same, and to a capacitor anode prepared from the tantalum powder. The method for preparing a composite tantalum powder comprises the following steps of: 1) providing a tantalum powder prepared by a reduction process, and flattening the tantalum powder so as to prepare a flaked tantalum powder; 2) providing a granular tantalum powder prepared from tantalum ingot; 3) mixing the flaked tantalum powder and the granular tantalum pow-
(Continued)

SEM picture (×3000 times) of the composite tantalum powder obtained in Example 4 der to give a tantalum powder mixture; and 4) thermally treating the tantalum powder mixture, and then pulverizing, screening to give a composite tantalum powder. The present invention further relates to a composite tantalum powder prepared from the process and the use thereof in a capacitor.

6 Claims, 2 Drawing Sheets

(51) Int. Cl.
| | |
|---|---|
| B22F 9/16 | (2006.01) |
| H01G 9/00 | (2006.01) |
| B22F 9/04 | (2006.01) |
| B22F 9/22 | (2006.01) |
| C22F 1/18 | (2006.01) |
| H01G 9/042 | (2006.01) |
| H01G 9/04 | (2006.01) |

(52) U.S. Cl.
CPC .......... *B22F 1/0088* (2013.01); *B22F 1/0096* (2013.01); *B22F 9/02* (2013.01); *B22F 9/04* (2013.01); *B22F 9/16* (2013.01); *B22F 9/22* (2013.01); *C22F 1/18* (2013.01); *H01G 9/00* (2013.01); *H01G 9/0029* (2013.01); *H01G 9/042* (2013.01); *B22F 2301/20* (2013.01); *B22F 2998/10* (2013.01); *H01G 2009/05* (2013.01)

(58) Field of Classification Search
CPC ...... B22F 9/16; B22F 9/02; B22F 1/00; B22F 2301/20; B22F 2998/10; H01G 9/042; H01G 9/0029; H01G 9/00; H01G 2009/05; C22F 1/18
See application file for complete search history.

(56) References Cited

U.S. PATENT DOCUMENTS

| | | | |
|---|---|---|---|
| 4,441,927 A | 4/1984 | Getz et al. | |
| 4,555,268 A | 11/1985 | Getz | |
| 4,740,238 A * | 4/1988 | Schiele | ................. B22F 1/0011 420/427 |
| 4,940,490 A | 7/1990 | Fife et al. | |
| 5,211,741 A | 4/1993 | Fife | |
| 5,261,942 A | 11/1993 | Fife et al. | |
| 5,580,367 A | 12/1996 | Fife | |
| 6,659,283 B1 * | 12/2003 | Muffoletto | .............. B03C 1/035 209/12.1 |
| 7,666,247 B2 | 2/2010 | He et al. | |
| 10,074,486 B2 * | 9/2018 | Yang | ......................... B22F 9/04 |
| 2005/0024810 A1* | 2/2005 | Yuan | ........................ C23C 8/34 361/305 |
| 2007/0068341 A1 | 3/2007 | Cheng et al. | |
| 2010/0085685 A1 | 4/2010 | Pinwill | |
| 2013/0242465 A1 | 9/2013 | Weaver et al. | |

FOREIGN PATENT DOCUMENTS

| | | |
|---|---|---|
| CN | 102592843 | 7/2012 |
| EP | 3089180 A1 | 11/2016 |
| JP | 2010/093255 | 4/2010 |

OTHER PUBLICATIONS

Office Action dated Mar. 5, 2019 in related Chinese Patent Application No. 201480081281.6, 4 pages.
First Office Action Chinese Patent Application No. 201480081281.6 dated Jul. 3, 2018 with English translation.
Office Action dated Mar. 14, 2019 in related European Patent Application No. 14900092.9, 3 pages.
Third Office Action dated Jul. 18, 2019 in related Chinese Patent Application No. 201480081281.6, 8 pages (including translation).

* cited by examiner

SEM picture (×1500 times) of the composite tantalum powder obtained in Example 4

SEM picture (×3000 times) of the composite tantalum powder obtained in Example 4 the SEM picture (×1500 times) of the conventional composite tantalum powder obtained in Comparative Example 1

SEM picture (×3000 times) of the conventional composite Tantalum powder obtained in Comparative Example 1

COMPOSITE TANTALUM POWDER AND PROCESS FOR PREPARING THE SAME AND CAPACITOR ANODE PREPARED FROM THE TANTALUM POWDER

CROSS-REFERENCE TO RELATED APPLICATIONS

This is the U.S. National Stage of PCT/CN2014/084757, filed Aug. 20, 2014, the entire contents of which is incorporated herein by reference in its entirety.

FIELD OF THE INVENTION

The invention is concerned with a composite tantalum powder and a process for preparing the same, and with tantalum capacitor anode prepared from the composite tantalum powder.

BACKGROUND OF THE INVENTION

Metal tantalum, being a valve metal, is able to form a dense oxidative film on a surface, so that the metal has the unilateral conduction property. Anode films prepared from the metal tantalum have stable chemical properties (particularly, the films are stable in an acidic electrolyte), a high electrical resistivity ($7.5 \times 10^{10}$ Ω·cm), a high dielectric constant (27.6), a small leakage current. In addition, the anode films further have the advantages of a broad working temperature range (from −80° C. to 200° C.), a high reliability, shock resistance, and a long life or the like. Thus, tantalum powder is an ideal material for preparing tantalum capacitors having a small volume and a high reliability. Since the tantalum capacitors have many advantages, they can be widely used in electronic devices of aviation, aerospace, communication, computer and cellphone.

The batch production of tantalum powder has a history 70-year or more. However, the production is developed in large scale and high speed merely in recent 50 years. As early as 1904, people employed carbon to reduce tantalum pentoxide, and the reduction product is refined at a high temperature and under vacuum, to obtain the first tantalum ingot having the ductility in the world. The fused salt electrolysis process which is developed afterward is economic, while requiring simple apparatus. Hence, the process is ever widely used. However, tantalum powder electrolyzed by conventional processes has simple particle shape, coarse particles, and a low specific capacitance, and thus the tantalum powder cannot meet the requirements of electronic industry to high capacitance tantalum powder. Carbothermal reduction of tantalum oxide, hydrogen reduction of tantalum pentoxide and aluminothermic reduction still are not applied in industrial productions. Tantalum powder prepared by the sodium reduction has the characteristics of a high purity, complex particle type, and a high specific capacitance, and thus the reduction process becomes a primary production process for tantalum powder at home and abroad. Now, manufacturers for tantalum powder in the world primarily include Cabot Group in U.S.A, HCST Group in German and Ningxia Orient Tantalum Industry Co. LTD. in China.

In view of material classification, tantalum powder special for the manufacture of a capacitor is called as a capacitor grade tantalum powder. Tantalum powder, according to used voltages, may be classified into high voltage tantalum powder (working voltage is higher than 35 V), intermediate voltage tantalum powder (working voltage is from 20 to 35 V), and low voltage tantalum powder (working voltage is below 20 V). Tantalum powder which are used in capacitors is about 60 to 70% of the total consumption of tantalum powder in the world. In particular, recently, with the rapid development of computer and electronic industry, tantalum powder is always required in a stable and raised trend, and it can be predicted that in the coming five to ten years, tantalum industry in the world will be continuously developed in a speed that the production amount is increased by 15% per year.

High voltage tantalum powder used in military products mainly is meant to 63V series tantalum powder manufactured by electron beam smelting, hydrogenation and pulverization, and its working voltage range can be expanded to between 50 V and 75 V. The high voltage tantalum powder is important in the fields of aviation, aerospace and military. Still some high voltage tantalum powder having the working voltage of from 35 to 50 V mainly includes intermediate voltage flaked tantalum powder and other tantalum powder having a high voltage resistance. Recently, intermediate voltage tantalum powder having the working voltage from 20 to 35 V is a hot spot of the later development in the art.

U.S. Pat. No. 3,647,415 discloses tantalum powder for electrolytic capacitors wherein tantalum particles in said powder have an average flakiness of 2 to 60, at least 80 percent by weight of said powder consisting of particles having a shorter breadth of 3 to 250 μm and said powder being free from particles having a shorter breadth of above 500 μm, and methods of preparing the same.

U.S. Pat. No. 4,441,927 discloses an ingot-derived agglomerated tantalum powder composition comprising a select granular tantalum powder and including a critical proportion of a select flaked tantalum powder. Both are derived from the tantalum ingot.

U.S. Pat. No. 4,555,268 is a method invention, relating to flaked tantalum powder having improved workability. The mixed powder is an agglomerated tantalum powder mixture made by electron beam smelting. It contains flaked tantalum powder (20-40%) and particular tantalum powder (70%). Prior to the mixing, the mixed tantalum powder are subjected to heat treatment at temperatures range from about 1250° C. to about 1550° C. for a period ranging from about 5 to about 120 minutes, so as to improve the workablity. The tantalum powder prepared according to the method in the patent is suitable for intermediate working voltage (20 V to 35 V).

U.S. Pat. No. 4,740,238 is concerned to an ingot-derived unagglomerated tantalum powder composition includes a platelet tantalum powder having an average Fisher sub-sieve size (FSSS) of less than two micrometers, preferably in the range of 0.6 to 1.1 micrometers, a Scott density not greater than 30 g/in$^3$, and a BET surface area of at least 0.7 m$^2$/g. The tantalum powder is tantalum powder in the pure flaked form.

U.S. Pat. No. 4,940,490 relates to an improved flaked tantalum powder and process for making the flaked powder are disclosed. The powder is characterized by having a Scott density greater than about 18 g/in$^3$ and preferably at least about 90% of the flaked particles having no dimension greater than about 55 micrometers. Agglomerates of the flaked tantalum powder, provide improved flowability, green strength and pressing characteristics compared to conventional flaked tantalum powders. The improved flaked tantalum powder can be made by preparing a large flaked tantalum and then reducing the flaked size until a Scott density greater than 18 g/in$^3$ is achieved. The tantalum powder is a tantalum powder in the pure flaked form.

In addition, the contents as recited in patents U.S. Pat. Nos. 5,211,741, 5,261,942, 5,580,367 and 5,261,942 are substantially the same as those in U.S. Pat. No. 4,940,490.

The prior art tantalum powder useful for an intermediate voltage capacitor mainly include flaked tantalum powder prepared by reducing tantalum powder with sodium or from tantalum ingot. These tantalum powders commonly have the disadvantages of bad particle shapes, and a too high oxygen content. More importantly, anode block prepared from the tantalum powders has poor electrical properties, for example, bad breakdown resistance, high leakage current, and too high loss or the like, and especially, the disadvantage of the too high leakage current can influence the applications of the tantalum powder.

SUMMARY OF THE INVENTION

The aim of the invention is to improve one or more of the above disadvantages. An aim of the invention is to provide an improved tantalum powder to reduce the leakage current of an anode block prepared from the tantalum powder. Another aim of the invention is to provide an improved tantalum powder to improve the capacitance of an anode block prepared from the tantalum powder. More particularly, the aim of the invention is to provide an improved tantalum powder to improve the combination properties of the capacitance and leakage current of an anode block prepared from the tantalum powder.

A composite tantalum powder is disclosed in the invention, and the composite tantalum powder consists of granular tantalum powder and flaked tantalum powder, wherein the granular tantalum powder and the flaked tantalum powder (also called as tantalum flaked powder or flattened tantalum powder) are interlaced with each other. Preferably, granular tantalum powder and flaked tantalum powder which are interlaced with each other form a structure similar to a scaffold. The granular tantalum powder is prepared from tantalum ingot, and the flaked tantalum powder is prepared by a reduction process. Said reduction processes include the sodium reduction, e.g., the reduction of potassium fluorotantalate with sodium, and the carbon reduction, e.g., the reduction of tantalum oxide with carbon.

In a preferred embodiment of the invention, the composite tantalum powder is composed of 50 to 80% by weight of a flaked tantalum powder and 20 to 50% by weight of a granular tantalum powder.

The invention further discloses a process for preparing the composite tantalum powder, comprising the following steps of:

1) providing a tantalum powder prepared by a reduction process, and flattening the tantalum powder so as to prepare a flaked tantalum powder;
2) providing a granular tantalum powder prepared from tantalum ingot;
3) mixing the flaked tantalum powder and the granular tantalum powder to give a tantalum powder mixture; and
4) thermally treating the tantalum powder mixture, and then pulverizing, screening to give a composite tantalum powder.

In the invention, many treatments are effected under vacuum. Here, the vacuum pressure is used to characterize the vacuum degree. It should be understood that the lower the vacuum pressure is, the higher the vacuum degree is; and the higher the vacuum pressure is, the lower the vacuum degree is.

It should be understood that said reduction processes include the sodium reduction, e.g., the reduction of potassium fluorotantalate with sodium, and carbon reduction, e.g., the reduction of tantalum oxide with carbon.

It is preferred that here, tantalum powder prepared by reducing fluorotantalate with sodium is used as the raw material to prepare the flaked tantalum powder, and the sodium-reducted tantalum powder has the following composition:

O≤2500 ppm, preferably ≤2300 ppm;
C≤25 ppm, preferably ≤18 ppm;
N≤200 ppm, preferably ≤90 ppm; and/or
Fe≤20 ppm, preferably ≤12 ppm.

It is preferred that tantalum powder prepared by the hydrogenation of tantalum ingot is used as the raw material to prepare the granular tantalum powder, which has the following composition:

O≤2000 ppm, preferably ≤1350 ppm;
C≤20 ppm, preferably ≤10 ppm;
N≤80 ppm, preferably ≤40 ppm; and/or
Fe≤20 ppm, preferably ≤10 ppm.

More preferably, the Fisher sub-sieve size (FSSS) of the granular tantalum powder ranges from 2.0 to 5.0 μm, preferably from 2.8 to 4.2 μm, and more preferably from 3.2 to 4 μm.

The invention further provides the following embodiments.

1] A process for preparing a composite tantalum powder, comprising the following steps of:
1) providing a tantalum powder prepared by a reduction process, and flattening the tantalum powder so as to prepare a flaked tantalum powder;
2) providing a granular tantalum powder prepared from tantalum ingot;
3) mixing the flaked tantalum powder and the granular tantalum powder to give a tantalum powder mixture; and
4) thermally treating the tantalum powder mixture, and then pulverizing, screening to give a composite tantalum powder.

2] The method as recited in the item 1], wherein the flattening in the step 1) is accomplished by ball-milling the tantalum powder prepared by a reduction process.

3] The method as recited in the item 1] or 2], further comprising a first thermal treatment to the flaked tantalum powder under vacuum before the step 3), and crushing, screening and magnetic separation.

4] The method as recited in the item 3], after the magnetic separation, further comprising the pre-agglomeration and a second thermal treatment, then subjecting the flaked tantalum powder to crushing, screening and deoxygenation, and following this, subjecting the flaked tantalum powder to acid washing and baking.

5] The method as recited in the item 3], wherein the first thermal treatment includes keeping the temperature at 800 to 1050° C. for a period ranging from 60 to 120 minutes, and then keeping the temperature at 1250 to 1350° C. for a period ranging from 60 to 120 minutes.

6] The method as recited in the item 3], wherein the crushing step is conducted by a jaw crusher, and the screening is conducted by screening with a 80- to 100-mesh sieve.

7] The method as recited in the item 4], wherein the pre-agglomeration is accomplished by the following steps of: adding pure water in an amount of 10 to 30% based on the weight of tantalum powder to the powder, and mixing the water and powder homogenously, then screening the mixture obtained from the mixing with a 50-mesh sieve twice, and baking the resultant tantalum powder at 100 to 120° C. under vacuum for a period ranging from 10 to 15 hours.

8] The method as recited in the item 7], wherein the vacuum pressure is less than $4 \times 10^4$ Pa.

9] The method as recited in the item 4], wherein the second thermal treatment is conducted at a vacuum pressure of less than $6\times10^{-3}$ Pa.

10] The method as recited in the item 4], wherein the second thermal treatment includes keeping the temperature at 800 to 1050° C. for a period ranging from 60 to 120 minutes, and keeping the temperature at 1350 to 1450° C. for a period ranging from 60 to 120 minutes.

11] The method as recited in the item 4], wherein the screening is conducted by screening with a 60- to 100-mesh sieve.

12] The method as recited in the item 4], wherein after the screening, the magnesium-reductive deoxygenation is conducted.

13] The method as recited in the item 12], wherein magnesium is added during the magnesium-reductive deoxygenation in an amount of 1.5 to 3% by weight of tantalum powder.

14] The method as recited in the item 12] or 13], wherein the magnesium-reductive deoxygenation includes keeping the temperature at 900 to 950° C. for a period ranging from 2 to 3 hours, and then demagging under vacuum for a period ranging from 2 to 3 hours.

15] The method as recited in the item 4], wherein the acid washing is accomplished by using 10% $HNO_3$ to wash the tantalum powder for a period ranging from 1.5 hours.

16] The method as recited in the item 4], wherein the baking is accomplished by vacuum baking the tantalum powder at 120° C. for a period of 12 hours.

17] The method as recited in any one of the preceding items, further comprising acid washing the granular tantalum powder before the step 3), and baking and screening the granular tantalum.

18] The method as recited in any one of the preceding items, wherein the granular tantalum powder comprise: O≤1500 ppm, C≤15 ppm, N≤40 ppm, and Fe≤10 ppm.

19] The method as recited in any one of the preceding items, wherein the average Fisher sub-sieve size (FSSS) of the granular powder is from 2.0 to 5.0 μm.

20] The method as recited in the item 17], after the screening, further comprising a first thermal treatment to the tantalum powder, and then crushing, screening and magnetic separation.

21] The method as recited in the item 20], after the magnetic separation, further comprising a second thermal treatment, screening and magnetic separation to the tantalum powder, and then deoxygenation, acid washing and baking.

22] The method as recited in the item 17], wherein the acid washing includes a first acid washing treatment and a second acid washing treatment.

23] The method as recited in the item 22], wherein the first acid treatment is conducted by using a mixed acid of 10-15% $HNO_3$+0.3-0.7% HF to wash the tantalum powder for a period ranging from 2 to 4 hours, then immersing the tantalum powder for a period ranging from 1 to 2 hours, and decanting the supernatant.

24] The method as recited in the item 22] or 23], wherein the second acid washing treatment is conducted by using a mixed acid of 15-20% $HNO_3$+0.3-0.7% HF+1.0-1.5% $H_2O_2$ to wash the tantalum powder for a period ranging from 2 to 4 hours, then immersing the tantalum powder for a period ranging from 1 to 2 hours, and decanting the supernatant.

25] The method as recited in the item 24], wherein after the supernatant is decanted, the tantalum powder is subjected to a suction filtration.

26] The method as recited in the item 25], where the suction filtration is accomplished by adding sufficient water to the supernatant to wash the supernatant twice, and then adding pure water to suction filter the supernatant until the conductivity of the filtrate is less than 30 μs/cm.

27] The method as recited in the item 17], wherein in a baker, the baking is conducted under vacuum.

28] The method as recited in the item 27], wherein the baking is conducted at 120° C. under vacuum for a period ranging from 12 to 15 hours.

29] The method as recited in the item 28], wherein the vacuum pressure is less than or equal to $4\times10^{-1}$ Pa.

30] The method as recited in the item 17], wherein the screening is conducted by screening with a 100- to 250-mesh sieve.

31] The method as recited in the item 20], wherein the first thermal treatment is conducted under vacuum.

32] The method as recited in the item 31], wherein the vacuumpressure of the vacuum is less than $6\times10^{-3}$ Pa.

33] The method as recited in the item 31] or 32], wherein the first thermal treatment includes heating the temperature to between 800 and 1000° C., and keeping the temperature for a period ranging from 60 to 120 minutes; and then heating the temperature to between 1050 and 1200° C., and keeping the temperature for a period ranging from 60 to 120 minutes.

34] The method as recited in the item 20], wherein the crushing is conducted by using a jar crusher.

35] The method as recited in the item 20], wherein the screening is conducted by screening with a 200-mesh sieve.

36] The method as recited in the item 21], wherein the second thermal treatment is conducted under vacuum.

37] The method as recited in the item 36], wherein the vacuum pressure of the vacuum is less than $6\times10^{-3}$ Pa.

38] The method as recited in the item 21], 36] or 37], wherein the second thermal treatment includes heating the temperature to between 800 and 1000° C., and keeping the temperature for a period ranging from 60 to 120 minutes; and then heating the temperature to between 1400 and 1500° C., and keeping the temperature for a period ranging from 60 to 120 minutes.

39] The method as recited in the item 21], wherein the screening is conducted by screening with a 60- to 80-mesh sieve.

40] The method as recited in the item 21], wherein the deoxygenation is the magnesium-reductive deoxygenation.

41] The method as recited in the item 40, wherein magnesium amount doped during the deoxygenation ranges from 0.5 to 1.5% by weight of the tantalum powder.

42] The method as recited in the item 21], 40] or 41], wherein the deoxygenation is conducted under an argon atmosphere.

43] The method as recited in the item 42], wherein the pressure of the argon atmosphere is $9\times10^4$ Pa.

44] The method as recited in the item 21], 40], 41] or 42], wherein the deoxygenation is accomplished by the steps of: heating the temperature to 950 to 980° C. and keeping the temperature for a period ranging from 2 to 3 hours; and then demagging the powder under vacuum at a temperature of 980° C. for a period ranging from 2 to 3 hours.

45] The method as recited in the item 21], wherein the acid washing is conducted by using 10-15% $HNO_3$ to wash the tantalum powder for a period of 1.5 hours.

46] The method as recited in the item 21], wherein the baking is accomplished by baking the tantalum powder at 100 to 150° C. under vacuum for a period ranging from 12 to 15 hours.

47] The method as recited in any one of the preceding items, wherein the mixture of a flaked tantalum powder and a granular tantalum powder is prepared from 50 to 80% by weight of the flaked tantalum powder and 20 to 50% by weight of the granular tantalum powder.

48] The method as recited in any one of the preceding items, after the crushing, screening in the step 4), further comprising the magnetic separation.

49] The method as recited in any one of the preceding items, wherein the thermal treatment in the step 4) is accomplished under vacuum.

50] The method as recited in the item 49], wherein the vacuum pressure is less than $6 \times 10^{-3}$ Pa.

51] The method as recited in the item 49], wherein the thermal treatment includes heating the powder mixture to 800-1050° C., and keeping the temperature for a period ranging from 30 to 60 minutes; and then heating the temperature to 1350 to 1500 and keeping the temperature for a period ranging from 60 to 120 minutes.

52] The method as recited in the item 1] or 48], wherein the crushing is conducted by using a jar crusher, and the screening is conducted by screening with a 60- to 80-mesh sieve.

53] The method as recited in any one of the preceding items, wherein in the microstructure of the resultant tantalum powder in the step 4), the flaked tantalum powder and the granular tantalum powder are interlaced with each other.

54] A composite tantalum powder, which is prepared from a mixture of a granular tantalum powder and a flaked tantalum powder by the means of thermal treatment, wherein the flaked tantalum powder and the granular tantalum powder are interlaced with each other.

55] The composite tantalum powder as recited in the item 54], wherein said flaked tantalum powder is prepared by flattening the tantalum powder obtained by a reduction process, and the granular tantalum powder is prepared from tantalum ingot.

56] The composite tantalum powder as recited in the item 54], wherein the reduction process includes the carbon reduction of tantalum oxide and the sodium reduction of potassium fluorotantalate.

57] The composite tantalum powder as recited in the item 54], 55] or 56], which is prepared from 50 to 80% by weight of the flaked tantalum powder and 20 to 50% by weight of the granular tantalum powder.

58] Use of the composite tantalum powder as recited in the item 54], 55], 56] or 57] in an electrolytic capacitor.

59] Use of the composite tantalum powder as recited in the item 54], 55], 56] or 57] in a solid electrolytic capacitor.

60] Use of the composite tantalum powder as recited in the item 54], 55], 56] or 57] in a liquid electrolytic capacitor.

61] A capacitor anode prepared from the composite tantalum powder as recited in the item 54], 55], 56] or 57].

In the tantalum powder according to the invention, the granular tantalum powder and the flaked tantalum powder are interlaced with each other, to form a scaffold structure, and thus the porosity of the tantalum powder is increased, so that the sintering property of the tantalum powder is improved, thereby to increase the electrical property of a corresponding capacitor. The specific capacitance of the novel tantalum powder ranges from 4000 to 15000 μFV/g.

The tantalum powder according to the invention has one or more of the following advantages:
1) a low leakage current of the anode block prepared from the powder;
2) a high breakdown voltage of the anode block prepared from the powder;
3) a low loss of the anode block prepared from the powder;
4) a low cost; and
5) being ready for the batch production.

Particularly, the anode block prepared from the tantalum powder of the invention has an excellent combination of the leakage current property and capacitance property.

ILLUSTRATIONS TO THE DRAWINGS

DESCRIPTIONS TO THE INVENTION

Figure 1:
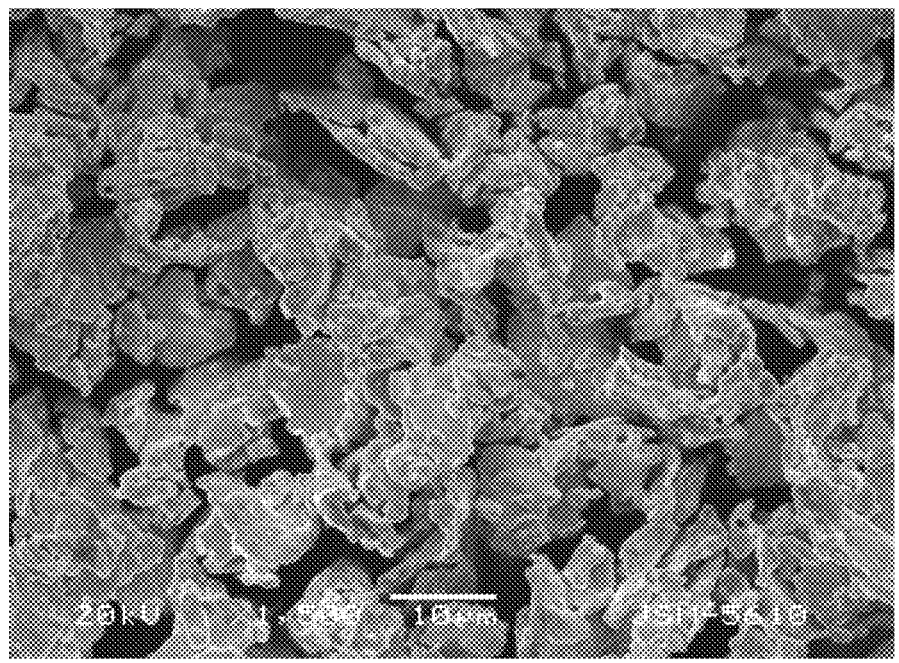
FIG. 1 shows the SEM picture (×1500 times) of the composite tantalum powder obtained in Example 4.

In the invention, the sign "%" is meant to the mass percentage, unless it is otherwise indicated.

In the invention, when the mesh is used to represent the particle size of powder, the signs "+" and "−" respectively represent "passing" or "no-passing" through sieves having said meshes. For example, the "−60-mesh" represents screening with 60-mesh sieves, and the "+200-mesh" represent not-passing through 200-mesh sieves. Analytic devices and types thereof for measuring individual parameters involved in the invention are shown in the following table:

| Analytic items | Names of analytic devices | Standard types |
| --- | --- | --- |
| CV | LCR precise measuring instrument | HP-4284A |
| Leakage current | Leakage current measuring instrument | QE2621 |
| O, N | Oxygen-nitrogen analyzer | LECO CS-436 |
| Fe | Direct-reading spectrometer | GV-5 |
| C | Carbon-sulfur analyzer | LECO CS-406 |
| SBD | Bulk density measuring instrument | FL4-1 |
| FSSS | Measuring instrument for average particle size | WLP-202 |
| P | Inductively coupled plasma atomic emission spectrometer | PE8000ACP |

In order to further illustrate the invention, the embodiments of the invention are described by combining the examples and the tables. However, it should be understood that these descriptions are aimed to further illustrate the features and advantageous of the invention, but not to restrict the scope of the claims in the invention.

The sodium-reduced tantalum powder used in the following examples has the following composition: 2300 ppm 0, 18 ppm C, 90 ppm N, and 12 ppm Fe. The used granular tantalum powder is prepared by hydrogenating tantalum ingot having the composition of 1350 ppm 0, 10 ppm C, 40 ppm N, and 10 ppm Fe, and having a Fisher Sub-sieve size (FSSS) of 2.85 μm.

Example 1

Firstly, a sodium-reduced tantalum powder is treated. Particularly, anhydrous alcohol is used as the milling medium to flatten the sodium-reduced tantalum powder. 30 Kg steel ball having a size of Φ3 mm are used, and the milling barrel, stirring slurry and steel ball are kept stainless and clean. The weight ratio of the steel ball to the material is controlled to be 6:1, and the weighed tantalum powder is added to the milling barrel of a milling machine to conduct the milling, wherein the rotating speed of the milling machine is 150 r/min, and the milling period time is 8 hour. Then, alcohol is suction filtered, and the obtained product is acid washed under conventional acid washing conditions and then screened with a 100-mesh sieve.

The milled tantalum powder is subjected to the first thermal treatment with the purpose for degasification, and at the same time for reducing the activity of the tantalum powder particles, so that the sintering property of the tantalum powder is improved. The specific thermal treatment procedure is described as follows: when the vacuum pressure is less than $6 \times 10^{-3}$ Pa, the tantalum powder is heated electrically to the temperature 1000° C. and the temperature is kept for a period of 120 minutes; then the temperature is raised to 1350° C. and the temperature is kept for a period of 60 minutes; after the first thermal treatment, the resultant product is crushed by using a jar crusher, and it is screened with a 100-mesh sieve and magnetic separated.

Subsequently, water is added to the tantalum powder to carry out the pre-agglomeration, and the concrete procedure is described as follows: 15% of water based on the weight of tantalum powder is added to the tantalum powder to be mixed homogenously via a spade, and then allow the mixture is screened with a 60-mesh sieve twice. The vacuum baking is conducted at 120° C. for a period of 14 hours, and the vacuum pressure during the baking is less than $4 \times 10^4$ Pa.

Following this, the second thermal treatment is conducted with the main purpose of high-temperature agglomeration and purification, and the concrete procedure is described as follows: when the vacuum pressure is less than $6 \times 10^{-3}$ Pa, an electrical heating is started to heat until the temperature is 1000° C. and the temperature is kept for a period of 60 minutes; then the temperature is raised to 1480° C. and the temperature is kept for 60 minutes; the resultant tantalum powder is crushed and then screened with a 100-mesh sieve; then, the tantalum powder is subjected to the first magnesium reductive deoxygenation, and the concrete conditions are as follows: the doping magnesium amount is 2.0% by weight of the tantalum powder, and the tantalum powder is kept at the temperature of 960° C. for a period of 3 hours; then the powder is subjected to demagging under vacuum for a period of 3 hours. The tantalum powder after the above treatments is acid washed and baked, and the acid washing conditions include the use of 10% $HNO_3$ to wash the tantalum powder for a period of 1.5 hours; then the washed tantalum powder is vacuum baked at 120° C. for a period of 12 hours to give a flaked reductive tantalum powder.

Secondly, a granular tantalum powder is treated. First of all, the granular tantalum powder is acid washed to remove impurities therein, including a first acid washing in which the tantalum powder is washed with 10% $HNO_3$+0.3% HF for a period of 3 hours, and then immersed for a period of 2 hours and the supernatant is decanted; and a second acid washing in which the tantalum powder is washed with 15% $HNO_3$+0.7% HF 1.0% $H_2O_2$ for a period of 2 hours, and then immersed for a period of 2 hours and the supernatant is finally decanted; sufficient water is added to rinse the tantalum powder twice and then the resultant tantalum powder is suction filtered by adding pure water. When the electrical conductivity of the filtrate is less than 30 µs/cm, the suction filtration is stopped, and the filtering cake is conveyed into a baker to be baked to dry. The vacuum baking is conducted at 120° C. for a period of 12 hours; and the vacuum pressure during the baking is less than or equal to $4 \times 10^4$ Pa. Following this, the tantalum powder is screened with a 200-mesh sieve.

Then, the resultant granular tantalum powder is subjected to a first thermal treatment with the purpose for the dehydrogenation. The specific procedure of the first thermal treatment procedure is described as follows: when the vacuum pressure is less than $6 \times 10^{-3}$ Pa, an electrical heating is started to heat the powder until the temperature is 800° C. and the temperature is kept for a period of 120 minutes; then the temperature is raised to 1050° C. and the temperature is kept for 120 minutes; after the first thermal treatment, the resultant product is crushed by using a jar crusher, and it is screened with a 200-mesh sieve and magnetic separated.

Following this, the granular tantalum powder is subjected to a second thermal treatment with the primary purpose of high-temperature agglomeration and purification, and the concrete procedure is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1480° C. and the temperature is kept for 60 minutes. After the second thermal treatment, the resultant tantalum powder is screened with a 80-mesh sieve and is subjected to a magnetic separation. After the two thermal treatments, the tantalum powder is subjected to the deoxygenation, and the concrete conditions are as follows: the doping magnesium amount is 1.0% by weight of the tantalum powder, and after the evacuation, the furnace is protected by filling argon gas, and the furnace pressure is $9 \times 10^4$ Pa; then the temperature is raised to 980° C. and the temperature is kept for a period of 3 hours; the powder is subjected to demagging under vacuum at 980° C. for a period of 3 hours. The tantalum powder after the above treatments is acid washed and baked, and the acid washing conditions include the use of 10% $HNO_3$ to wash the tantalum powder for a period of 1.5 hours. The washed tantalum powder is vacuum baked at 120° C. for a period of 12 hours to give a granular tantalum powder.

At last, the flaked tantalum powder and the granular tantalum powder is mixed in the ratio of 50%/50%, and then the mixture is subjected to a thermal treatment. The concrete procedure of the thermal treatment is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1500° C. and the temperature is kept for 60 minutes; after the thermal treatment, the resultant tantalum powder is crushed by using a jar crusher, and it is screened with a 80-mesh sieve; then, the tantalum powder is magnetic separated via a magnetic separator to remove ferromagnetic substances, such as iron, entrapped during the crushing procedure.

At last, a composite tantalum powder product is produced.

Example 2

Firstly, a sodium-reduced tantalum powder is treated. Specifically, anhydrous alcohol is used as the milling medium to flatten the sodium-reduced tantalum powder. 30 Kg steel ball having a size of Φ3 mm are used, and the milling barrel, stirring slurry and steel ball are kept stainless and clean. The weight ratio of the steel ball to the material is controlled to be 6:1, and the weighed tantalum powder is added to the milling barrel of a milling machine to conduct the milling, wherein the rotating speed of the milling machine is 150 r/min, and the milling period time is 8 hour. Then, alcohol is suction filtered, and the obtained product is acid washed under conventional acid washing conditions and screened with a 150-mesh sieve.

The milled tantalum powder is subjected to a first thermal treatment with the purpose for degasification, and at the same time for reducing the activity of the tantalum powder particles, so that the sintering property of the tantalum powder is improved. The specific thermal treatment procedure is described as follows: when the vacuum pressure is less than $6\times10^{-3}$ Pa, the tantalum powder is heated electrically to the temperature 1000° C. and the temperature is kept for a period of 120 minutes; then the temperature is raised to 1300° C. and the temperature is kept for a period of 60 minutes; after the first thermal treatment, the resultant product is crushed by using a jar crusher, and then screened with a 100-mesh sieve and magnetic separated.

Subsequently, water is added to the tantalum powder to carry out the pre-agglomeration, and the concrete procedure is described as follows: 15% of water based on the weight of tantalum powder is added to the tantalum powder to be mixed homogenously via a spade, and then the mixture is screened with a 60-mesh sieve twice. The vacuum baking is conducted at 120° C. for a period of 12 hours, and the vacuum pressure during the baking is less than $4\times10^4$ Pa.

Following this, a second thermal treatment is conducted with the main purpose of high-temperature agglomeration and purification, and the concrete procedure is described as follows: when the vacuum pressure is less than $6\times10^{-3}$ Pa, an electrical heating is started to heat the powder until the temperature is 1000° C. and the temperature is kept for a period of 60 minutes; then the temperature is raised to 1480° C. and the temperature is kept for 60 minutes; the resultant tantalum powder is crushed, and it is screened with a 100-mesh sieve; then, the tantalum powder is subjected to the first magnesium reductive deoxygenation, and the concrete conditions are as follows: the doping magnesium amount is 2.0% by weight of the tantalum powder, and the tantalum powder is kept at the temperature of 980° C. for a period of 3 hours; then the powder is subjected to demagging under vacuum for a period of 3 hours. The tantalum powder after the above treatments is acid washed and baked, and the acid washing conditions include the use of 10% $HNO_3$ to wash the tantalum powder for a period of 1.5 hours; then the washed tantalum powder is vacuum baked at 120° C. for a period of 12 hours to give a flaked tantalum powder.

Secondly, a granular tantalum powder is treated. First of all, the granular tantalum powder is acid washed to remove impurities therein, including a first acid washing in which the tantalum powder is washed with 10% $HNO_3$+0.3% HF for a period of 3 hours, and then immersed for a period of 2 hours and the supernatant is decanted; and a second acid washing in which the tantalum powder is washed with 15% $HNO_3$+0.7% HF+1.0% $H_2O_2$ for a period of 2 hours, and then immersed for a period of 2 hours and the supernatant is decanted; sufficient water is added to rinse the tantalum powder twice and then the resultant tantalum powder is suction filtered by adding pure water. When the electrical conductivity of the filtrate is less than 30 μs/cm, the suction filtration is stopped, and the filtering cake is conveyed into a baker to be baked to dry. The vacuum baking is conducted at 120° C. for a period of 15 hours, and the vacuum pressure during the baking is less than or equal to $4\times10^4$ Pa. Following this, the tantalum powder is screened with a 200-mesh sieve.

Then, the resultant granular tantalum powder is subjected to a first thermal treatment with the purpose for the dehydrogenation. The specific procedure of the first thermal treatment procedure is described as follows: when the vacuum pressure is less than $6\times10^{-3}$ Pa, an electrical heating is started to heat the powder until temperature is 800° C. and the temperature is kept for a period of 120 minutes; then the temperature is raised to 1050° C. and the temperature is kept for 120 minutes; after the first thermal treatment, the resultant product is crushed by using a jar crusher, and it is screened with a 200-mesh sieve and magnetic separated.

Following this, the granular tantalum powder is subjected to a second thermal treatment with the primary purpose of high-temperature agglomeration and purification, and the concrete procedure is described as follows: when the vacuum pressure is less than $6\times10^{-3}$ Pa, an electrical heating is started to heat the powder until temperature is 1000° C. and the temperature is kept for a period of 60 minutes; then the temperature is raised to 1480° C. and the temperature is kept for 60 minutes. After the second thermal treatment, the resultant tantalum powder is screened with a 80-mesh sieve and is subjected to a magnetic separation. After the two thermal treatments, the tantalum powder is subjected to the deoxygenation, and the concrete conditions are as follows: the doping magnesium amount is 1.0% by weight of the tantalum powder, and after the evacuation, the furnace is protected by filling argon gas, and the furnace pressure is $9\times10^4$ Pa; then the temperature is raised to 980° C. and the temperature is kept for a period of 3 hours; the powder is subjected to demagging under vacuum at 980 for a period of 3 hours. The tantalum powder after the above treatments is acid washed and baked, and the acid washing conditions include the use of 10% $HNO_3$ to wash the tantalum powder for a period of 1.5 hours. The washed tantalum powder is vacuum baked at 120° C. for a period of 12 hours to give a granular tantalum powder.

At last, the flaked tantalum powder and the granular tantalum powder is mixed in the ratio of 80%/20%, and then the mixture is subjected to a thermal treatment. The concrete procedure of the thermal treatment is described as follows: when the vacuum pressure is less than $6\times10^{-3}$ Pa, an electrical heating is started to heat the powder until the temperature is 1000 and the temperature is kept for a period of 60 minutes; then the temperature is raised to 1500° C. and the temperature is kept for 60 minutes; after the thermal treatment, the resultant tantalum powder is crushed by using a jar crusher, and it is screened with a 80-mesh sieve; then, the tantalum powder is magnetic separated via a magnetic separator to remove ferromagnetic substances, such as iron, entrapped during the crushing procedure.

At last, a composite tantalum powder product is produced.

Example 3

Firstly, a sodium-reduced tantalum powder is treated. Specifically, anhydrous alcohol is used as the milling medium to flatten the sodium-reduced tantalum powder. 30 Kg steel ball having a size of 13 mm are used, and the milling barrel, stirring slurry and steel ball are kept stainless and clean. The weight ratio of the steel ball to the material is controlled to be 6:1, and the weighed tantalum powder is added to the milling barrel of a milling machine to conduct the milling, wherein the rotating speed of the milling machine is 150 r/min, and the milling period time is 8 hour. Then, alcohol is suction filtered, and the obtained product is acid washed under conventional acid washing conditions and screened with a 150-mesh sieve.

The milled tantalum powder is subjected to a first thermal treatment with the purpose for degasification, and at the same time for reducing the activity of the tantalum powder particles, so that the sintering property of the tantalum powder is improved. The specific thermal treatment procedure is described as follows: when the vacuum pressure is less than $6\times10^{-3}$ Pa, the tantalum powder is heated electrically to the temperature 1000° C. and the temperature is kept for a period of 120 minutes; then the temperature is raised to 1350° C. and the temperature is kept for a period of 60 minutes; after the first thermal treatment, the resultant product is crushed by using a jar crusher, and then screened with a 100-mesh sieve and magnetic separated.

Subsequently, water is added to the tantalum powder to carry out the pre-agglomeration, and the concrete procedure is described as follows: 15% of water based on the weight of tantalum powder is added to the tantalum powder to be mixed homogenously via a spade, and then the mixture is screened with a 60-mesh sieve twice. The vacuum baking is conducted at 120° C. for a period of 12 hours, and the vacuum pressure during the baking is less than $4\times10^4$ Pa.

Following this, a second thermal treatment is conducted with the main purpose of high-temperature agglomeration and purification, and the concrete procedure is described as follows: when the vacuum pressure is less than $6\times10^{-3}$ Pa, an electrical heating is started to heat the powder until the temperature is 1000° C. and the temperature is kept for a period of 60 minutes; then the temperature is raised to 1480° C. and the temperature is kept for 60 minutes; the resultant tantalum powder is crushed by using a jar crusher, and it is screened with a 100-mesh sieve; then, the tantalum powder is subjected to the first magnesium reductive deoxygenation, and the concrete conditions are as follows: the doping magnesium amount is 2.0% by weight of the tantalum powder, and the tantalum powder is kept at the temperature of 980° C. for a period of 3 hours; then the powder is subjected to demagging under vacuum for a period of 3 hours. The tantalum powder after the above treatments is acid washed and baked, and the acid washing conditions include the use of 10% $HNO_3$ to wash the tantalum powder for a period of 1.5 hours; then the washed tantalum powder is vacuum baked at 120° C. for a period of 12 hours to give a flaked tantalum powder.

Secondly, a granular tantalum powder is treated. First of all, the granular tantalum powder is acid washed to remove impurities therein, including a first acid washing in which the tantalum powder is washed with 10% $HNO_3$+0.3% HF for a period of 3 hours, and then immersed for a period of 2 hours and the supernatant is decanted; and a second acid washing in which the tantalum powder is washed with 15% $HNO_3$+0.7% HF+1.0% $H_2O_2$ for a period of 2 hours, and then immersed for a period of 2 hours and the supernatant is finally decanted; sufficient water is added to rinse the tantalum powder twice and then the resultant tantalum powder is suction filtered by adding pure water. When the electrical conductivity of the filtrate is less than 30 μs/cm, the suction filtration is stopped, and the filtering cake is conveyed into a baker to be baked to dry. The vacuum baking is conducted at 120° C. for a period of 15 hours, and the vacuum pressure during the baking is less than or equal to $4\times10^4$ Pa. Following this, the tantalum powder is screened with a 200-mesh sieve.

Then, the resultant granular tantalum powder is subjected to a first thermal treatment with the purpose for the dehydrogenation. The specific procedure of the first thermal treatment is described as follows: when the vacuum pressure is less than $6\times10^{-3}$ Pa, an electrical heating is started to heat the powder until the temperature is 800° C. and the temperature is kept for a period of 120 minutes; then the temperature is raised to 1050° C. and the temperature is kept for 120 minutes; after the first thermal treatment, the resultant product is crushed by using a jar crusher, and then screened with a 200-mesh sieve and magnetic separated.

Following this, the granular tantalum powder is subjected to a second thermal treatment with the primary purpose of high-temperature agglomeration and purification, and the concrete procedure is described as follows: when the vacuum pressure is less than $6\times10^{-3}$ Pa, an electrical heating is started to heat the powder until the temperature is 1000° C. and the temperature is kept for a period of 60 minutes; then the temperature is raised to 1480° C. and the temperature is kept for 60 minutes. After the second thermal treatment, the resultant tantalum powder is screened with a 80-mesh sieve and is subjected to a magnetic separation. After the two thermal treatments, the tantalum powder is subjected to the deoxygenation, and the concrete conditions are as follows: the doping magnesium amount is 1.0% by weight of the tantalum powder, and after the evacuation, the furnace is protected by filling argon gas, and the furnace pressure is $9\times10^4$ Pa; then the temperature is raised to 980° C. and the temperature is kept for a period of 3 hours; the powder is subjected to demagging under vacuum at 980° C. for a period of 3 hours. The tantalum powder after the above treatments is acid washed and baked, and the acid washing conditions include the use of 10% $HNO_3$ to wash the tantalum powder for a period of 1.5 hours. The washed tantalum powder is vacuum baked at 120° C. for a period of 12 hours to give a granular tantalum powder.

At last, the flaked tantalum powder and the granular tantalum powder is mixed in the ratio of 60%/40%, and then the mixture is subjected to a thermal treatment. The concrete procedure of the thermal treatment is described as follows: when the vacuum pressure is less than $6\times10^{-3}$ Pa, an electrical heating is started to heat the powder until the temperature is 1000° C. and the temperature is kept for a period of 60 minutes; then the temperature is raised to 1490° C. and the temperature is kept for 60 minutes; after the thermal treatment, the resultant tantalum powder is crushed by using a jar crusher, and then screened with a 80-mesh sieve; then, the tantalum powder is magnetic separated via a magnetic separator to remove ferromagnetic substances, such as iron, entrapped during the crushing procedure.

At last, a composite tantalum powder product is produced.

Example 4

Firstly, a sodium-reduced tantalum powder is treated. Specifically, anhydrous alcohol is used as the milling medium to flatten the sodium-reduced tantalum powder. 30 Kg steel ball having a size of Φ3 mm are used, and the milling barrel, stirring slurry and steel ball are kept stainless and clean. The weight ratio of the steel ball to the material is controlled to be 6:1, and the weighed tantalum powder is added to the milling barrel of a milling machine to conduct the milling; wherein the rotating speed of the milling machine is 200 r/min, and the milling period time is 6 hour. Then, alcohol is suction filtered, and the obtained product is acid washed under conventional acid washing conditions and screened with a 150-mesh sieve.

The milled tantalum powder is subjected to a first thermal treatment with the purpose for degasification, and at the same time for reducing the activity of the tantalum powder particles, so that the sintering property of the tantalum powder is improved. The specific thermal treatment procedure is described as follows: when the vacuum pressure is less than $6\times10^{-3}$ Pa, the tantalum powder is heated electrically to the temperature 1000° C. and the temperature is kept for a period of 120 minutes; then the temperature is raised to 1350° C. and the temperature is kept for a period of 60 minutes; after the first thermal treatment, the resultant product is crushed by using a jar crusher, and then screened with a 100-mesh sieve and magnetic separated.

Subsequently, water is added to the tantalum powder to carry out the pre-agglomeration, and the concrete procedure is described as follows: 15% of water based on the weight of tantalum powder is added to the tantalum powder to be mixed homogenously via a spade, and then the mixture is screened with a 60-mesh sieve twice. The vacuum baking is conducted at 120° C. for a period of 12 hours, and the vacuum pressure during the baking is less than $4 \times 10^4$ Pa.

Following this, a second thermal treatment is conducted with the main purpose of high-temperature agglomeration and purification, and the concrete procedure is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1450° C. and the temperature is kept for 60 minutes; the resultant tantalum powder is crushed, and it is screened with a 100-mesh sieve; then, the tantalum powder is subjected to the first magnesium reductive deoxygenation, and the concrete conditions are as follows: the doping magnesium amount is 2.0% by weight of the tantalum powder, and the tantalum powder is kept at the temperature of 960 for a period of 3 hours; then the powder is subjected to demagging under vacuum for a period of 3 hours. The tantalum powder after the above treatments is acid washed and baked, and the acid washing conditions include the use of 10% $HNO_3$ to wash the tantalum powder for a period of 1.5 hours; then the washed tantalum powder is vacuum baked at 120° C. for a period of 12 hours to give a flaked tantalum powder.

Secondly, a granular tantalum powder is treated. First of all, the granular tantalum powder is acid washed to remove impurities therein, including a first acid washing in which the tantalum powder is washed with 10% $HNO_3$+0.3% HF for a period of 3 hours, and then immersed for a period of 2 hours and the supernatant is decanted; and a second acid washing in which the tantalum powder is washed with 15% $HNO_3$+0.7% HF+1.0% $H_2O_2$ for a period of 2 hours, and then immersed for a period of 2 hours and the supernatant is finally decanted; sufficient water is added to rinse the tantalum powder twice and then the resultant tantalum powder is suction filtered by adding pure water. When the electrical conductivity of the filtrate is less than 30 μs/cm, the suction filtration is stopped, and the filtering cake is conveyed into a baker to be baked to dry. The vacuum baking is conducted at 120° C. for a period of 15 hours; and the vacuum pressure during the baking is less than or equal to $4 \times 10^4$ Pa. Following this, the tantalum powder is screened with a 200-mesh sieve.

Then, the resultant granular tantalum powder is subjected to a first thermal treatment with the purpose for the dehydrogenation. The specific procedure of the first thermal treatment procedure is described as follows: when the vacuum pressure is less than $6 \times 10^{-3}$ Pa, an electrical heating is started to heat the powder until the temperature is 800° C. and the temperature is kept for a period of 120 minutes; then the temperature is raised to 1050° C. and the temperature is kept for 120 minutes; after the first thermal treatment, the resultant product is crushed by using a jar crusher, and then screened with a 200-mesh sieve and magnetic separated.

Following this, the granular tantalum powder is subjected to a second thermal treatment with the primary purpose of high-temperature agglomeration and purification, and the concrete procedure is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1480° C. and the temperature is kept for 60 minutes. After the second thermal treatment, the resultant tantalum powder is screened with a 80-mesh sieve and is subjected to a magnetic separation. After the two thermal treatments, the tantalum powder is subjected to the deoxygenation, and the concrete conditions are as follows: the doping magnesium amount is 1.0% by weight of the tantalum powder, and after the evacuation, the furnace is protected by filling argon gas, and the furnace pressure is $9 \times 10^4$ Pa; then the temperature is raised to 980° C. and the temperature is kept for a period of 3 hours; the powder is subjected to demagging under vacuum for a period of 3 hours at 980° C. The tantalum powder after the above treatments is acid washed and baked, and the acid washing conditions include the use of 10% $HNO_3$ to wash the tantalum powder for a period of 1.5 hours. The washed tantalum powder is vacuum baked at 120° C. for a period of 12 hours to give a granular tantalum powder.

At last, the flaked tantalum powder and the granular tantalum powder is mixed in the ratio of 70%/30%, and then the mixture is subjected to a thermal treatment. The concrete procedure of the thermal treatment is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1490° C. and the temperature is kept for 60 minutes; after the thermal treatment, the resultant tantalum powder is crushed by using a jar crusher, and it is screened with a 80-mesh sieve; then, the tantalum powder is magnetic separated with a magnetic separator to remove ferromagnetic substances, such as iron, entrapped during the crushing procedure.

At last, a composite tantalum powder product is produced.

Comparative Example 1

A sodium-reduced tantalum powder is treated. Specifically, anhydrous alcohol is used as the milling medium to flatten the sodium-reduced tantalum powder.

30 Kg steel ball having a size of 3 mm are used, and the milling barrel, stirring slurry and steel ball are kept stainless and clean. The weight ratio of the steel ball to the material is controlled to be 6:1, and the weighed tantalum powder is added to the milling barrel of a milling machine to conduct the milling, wherein the rotating speed of the milling machine is 200 r/min, and the milling period time is 6 hour. Then, alcohol is suction filtered, and the obtained product is acid washed under conventional acid washing conditions and is screened with a 100-mesh sieve.

The milled tantalum powder is subjected to a first thermal treatment with the purpose for degasfication, and at the same time for reducing the activity of the tantalum powder particles, so that the sintering property of the tantalum powder is improved. The specific procedure of the thermal treatment is described as follows: when the vacuum pressure is less than $6 \times 10^{-3}$ Pa, an electrical heating is started to heat the powder until the temperature is 1000° C. and the temperature is kept for a period of 120 minutes; then the temperature is raised to 1350° C. and the temperature is kept for 60 minutes; after the first thermal treatment, the resultant product is crushed by using a jar crusher, and it is screened with a 80-mesh sieve and magnetic separated.

Subsequently, water is added to the tantalum powder to carry out the pre-agglomeration, and the concrete procedure is described as follows: 15% of pure water based on the weight of tantalum powder is added to the tantalum powder to be mixed homogenously via a spade, and then the mixture is screened with a 60-mesh sieve twice. The vacuum baking is conducted at 120° C. for a period of 12 hours, and the vacuum pressure during the baking is less than 4×10⁴ Pa.

Subsequently, a second thermal treatment is conducted with the primary purpose of high-temperature agglomeration and purification, and the concrete procedure is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1450° C. and the temperature is kept for 60 minutes; the resultant tantalum powder is crushed by using a jar crusher, and it is screened with a 80-mesh sieve; then, the tantalum powder is subjected to a first magnesium reductive deoxygenation, and the concrete conditions are as follows: the doping magnesium amount is 2.0% by weight of the tantalum powder, and the tantalum powder is kept at the temperature 960° C. for a period of 3 hours; following this, the powder is subjected to demagging under vacuum for a period of 3 hours. The tantalum powder after the above treatments is acid washed and baked, and the acid washing conditions includes the use of 10% $HNO_3$ for a period of 1.5 hours; then the washed tantalum powder is vacuum baked at 120° C. for a period of 12 hours.

At last, the resultant tantalum powder is subjected to a thermal treatment to give the final product. The concrete procedure of the thermal treatment is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1480° C. and the temperature is kept for 60 minutes; after the thermal treatment, the resultant tantalum powder is crushed by using a jar crusher, and it is screened with a 80-mesh sieve; then, the tantalum powder is magnetic separated via a magnetic separator to remove ferromagnetic substances; such as iron, entrapped during the crushing procedure. Finally, conventional tantalum powder product is given.

Comparative Example 2

The comparative example is carried out according to the method as taught in U.S. Pat. No. 4,555,268. The tantalum powder in fine particles obtained by hydrogenating tantalum ingot is used as the raw material, and the raw material has the following characteristics: O: 1350 ppm, C: 10 ppm, N: 40 ppm, Fe: 10 ppm; average Fisher Sub-sieve size (FSSS): 2.0 to 5.0 μm. 70% of tantalum powder in the raw material tantalum powder is subjected to a first thermal treatment with the purpose for dehydrogenation, and at the same time for reducing the activity of the tantalum powder particles, so that the sintering property of the tantalum powder is improved. The specific thermal treatment procedure is described as follows: when the vacuum pressure is less than $6 \times 10^{-3}$ Pa, an electrical heating is started to heat the powder until the temperature is 1000° C. and the temperature is kept for a period of 120 minutes; then the temperature is raised to 1250° C. and the temperature is kept for 60 minutes; after the first thermal treatment, the resultant product is crushed by using a jar crusher, and it is screened with a 80-mesh sieve, and magnetic separated via a magnetic separator to give a granular tantalum powder.

The other 30% of tantalum powder is flattened by using anhydrous alcohol as the milling medium. 30 Kg steel ball having a size of Φ3 mm are used, and the milling barrel, stirring slurry and steel ball are kept stainless and clean. The weight ratio of the steel ball to the material is controlled to be 6:1, and the weighed tantalum powder is added to the milling barrel of a milling machine to conduct the milling, wherein the rotating speed of the milling machine is 200 r/min, and the milling period time is 6 hour. Then, alcohol is suction filtered, and the obtained product is acid washed under conventional acid washing conditions and is screened with a 100-mesh sieve.

The milled crude tantalum powder is subjected to a first thermal treatment with the purpose for degasification, and at the same time for reducing the activity of the tantalum powder particles, so that the sintering property of the tantalum powder is improved. The specific procedure of the thermal treatment is described as follows: when the vacuum pressure is less than $6 \times 10^{-3}$ Pa, an electrical heating is started to heat the powder until the temperature is 1000° C. and the temperature is kept for a period of 120 minutes; then the temperature is raised to 1350° C. and the temperature is kept for 60 minutes; after the first thermal treatment, the resultant product is crushed by using a jar crusher, and it is screened with a 80-mesh sieve and magnetic separated to give a flaked granular powder.

Subsequently, the granular tantalum powder and the flaked tantalum powder is mixed in a ratio of 70%/30%, and then the mixture is subjected to the second thermal treatment with the primary purpose of high-temperature agglomeration and purification, and the concrete procedure is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1450° C. and the temperature is kept for 60 minutes; the resultant tantalum powder is crushed, and is screened with a 80-mesh sieve; then, the tantalum powder is subjected to the first magnesium reductive deoxygenation, and the concrete conditions are as follows: the doping magnesium amount is 2.0% by weight of the tantalum powder, and the tantalum powder is kept at the temperature 960° C. for a period of 3 hours; then the powder is subjected to demagging under vacuum for a period of 3 hours. The tantalum powder after the above treatments is acid washed and baked, and the acid washing conditions includes the use of 10% $HNO_3$ to wash the tantalum powder for a period of 1.5 hours; then the washed tantalum powder is vacuum baked at 120° C. for a period of 12 hours.

At last, the dried tantalum powder is subjected to a thermal treatment to give the final product. The concrete procedure of the thermal treatment is described as follows: when the vacuum pressure is less than $6 \times 10^{-3}$ Pa, an electrical heating is started to heat the powder until the temperature is 1000° C. and the temperature is kept for a period of 60 minutes; then the temperature is raised to 1480° C. and the temperature is kept for 60 minutes; after the thermal treatment, the resultant tantalum powder is crushed by using a jar crusher, and it is screened with a 80-mesh sieve; then, the tantalum powder is magnetic separated via a magnetic separator to remove ferromagnetic substances, such as iron, entrapped during the crushing procedure. At last, a tantalum powder product produced by a conventional process is obtained.

Tantalum powders obtained in Example 1, Example 2, Example 3, Example 4 and Comparative Example 1, Comparative Example 2 are analyzed to give the following results:

TABLE 1

Individual physical properties of tantalum powder

| Sample | Fsss (μm) | SBD (g/cc) | +80 mesh(%) | −325 mesh (%) |
|---|---|---|---|---|
| Example1 | 4.25 | 1.72 | 1.32 | 50.58 |
| Example2 | 4.46 | 1.82 | 1.08 | 48.40 |
| Example3 | 4.64 | 1.80 | 0.68 | 49.56 |
| Example4 | 4.58 | 1.76 | 1.52 | 49.24 |
| Comparative Example 1 | 4.10 | 1.45 | 0.86 | 58.32 |
| Comparative Example 2 | 6.25 | 2.15 | 0.62 | 55.46 |

In the table, the "Fsss" (μm) represents the Fisher sub-sieve size; the "SBD (g/cc)" represents the bulk density; the "+80(%)" represents the proportion of tantalum powder with the size of greater than 80 meshes; and the "−325(%)" represents the portion of tantalum powder with the size of less than 325 meshes.

TABLE 2

Amounts of main impurities in tantalum powder (unit: ppm)

| | Chemical impurity | | | | |
|---|---|---|---|---|---|
| Sample | O | C | N | Fe | P |
| Example 1 | 1760 | 23 | 100 | 18 | 65 |
| Example 2 | 1720 | 26 | 130 | 16 | 55 |
| Example3 | 1680 | 25 | 100 | 17 | 60 |
| Example4 | 1650 | 23 | 110 | 21 | 65 |
| Comparative Example1 | 1960 | 35 | 150 | 23 | 65 |
| Comparative Example2 | 1520 | 25 | 90 | 18 | 60 |

The tantalum powder samples prepared in Examples 1-4 and the comparative examples are prepared into anode block samples to make tests. Specifically, individual samples are compressed. The density of resulting briquette is 5.5 g/cm³, and the weight of the core powder is 0.2 g. The mold in use is a mold with a size of Φ3 mm, and the samples are tested according to National Standard GBT 3137-2007 (Testing Method for Electrical Properties of Tantalum Powder). The compressed powder sample is sintered at 1700° C. for a period of 30 minutes at a vacuum furnace of $10^{-3}$ Pa to give a sintered block, and then the sintered block is energized in a 0.01% (mass percentage) phosphoric acid solution at 200 V for a period of 120 minutes to give an anode block, in which the energization temperature is 90° C. and the current density is 35 mA/g. The measured electrical properties of individual samples are shown in Table 3.

TABLE 3

Comparisons of electrical properties of tantalum powder

| Sample | K × $10^{-4}$ (μA/μFV) | CV (μFV/g) | tgδ (%) | VB (V) | SHV (%) |
|---|---|---|---|---|---|
| Example1 | 2.2 | 11776 | 3.0 | 241 | 18.1 |
| Example2 | 2.0 | 11865 | 2.7 | 240 | 17.6 |
| Example3 | 2.0 | 12250 | 2.0 | 240 | 18.2 |
| Example4 | 2.1 | 12580 | 2.8 | 241 | 17.6 |
| Comparative Example1 | 3.0 | 12860 | 3.2 | 232 | 20.6 |
| Comparative Example2 | 2.8 | 8620 | 2.0 | 230 | 16.2 |

In the table, the "K×$10^{-4}$(μA/μFV)" represents the leakage current; the "CV(μFV/g)" represents the capacitance; the "tgδ(%)" represents the loss; the "VB(V)" represents the breakdown voltage; and "SHV (%)" represents the volume contraction rate.

As seen from the comparisons between the data of the above examples and comparative examples, an anode block prepared from the tantalum powder obtainable by the method of the invention has the capacitance ranging between 10000 μFV/g and 13000 μFV/g while the oxygen content is slightly reduced, and the product has an increased breakdown resistance and an improved leakage current. As seen from Table 3, the anode block prepared from the tantalum powder of the invention can have both a low leakage current and a high capacitance.

Figure 2:
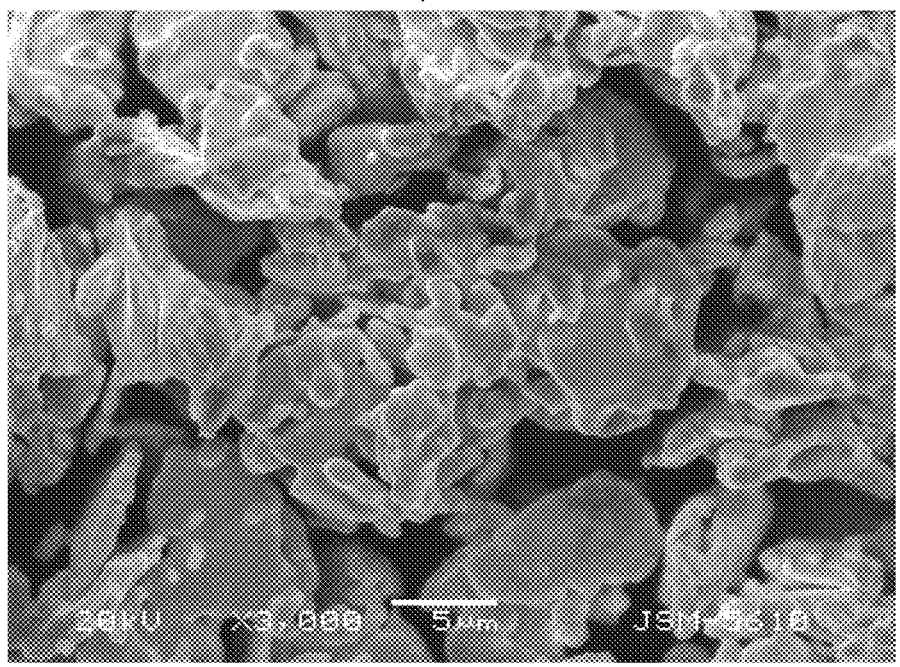
FIG. 2 shows the SEM picture (×3000 times) of the composite tantalum powder obtained in Example 4.

As seen from FIGS. 1 and 2, the product is composed of a flaked tantalum powder and a block tantalum powder which are interlaced with each other, which assures that the tantalum powder has a better porosity.

Figure 3:
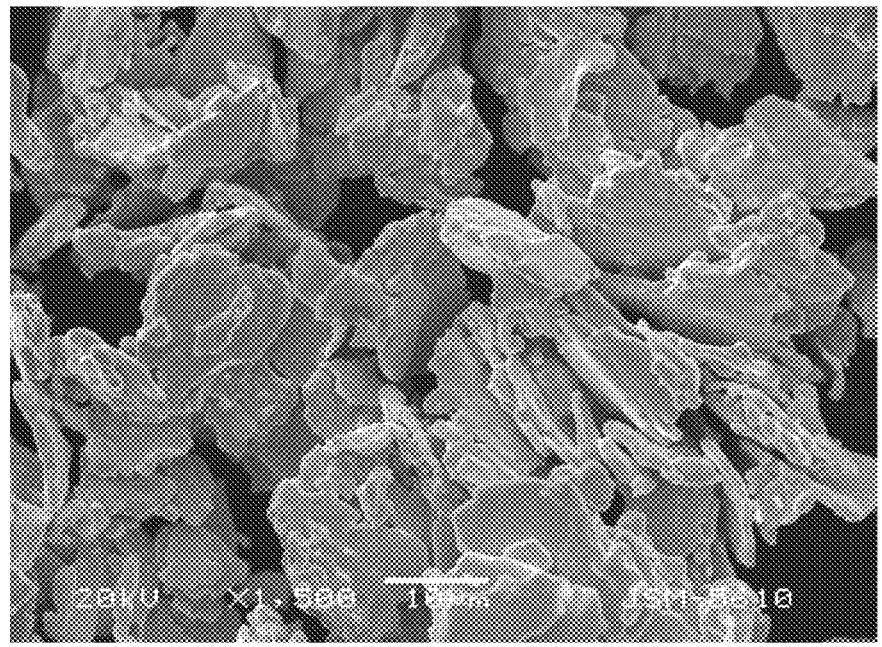
FIG. 3 shows the SEM picture (×1500 times) of the conventional composite tantalum powder obtained in Comparative Example 1.
Figure 4:
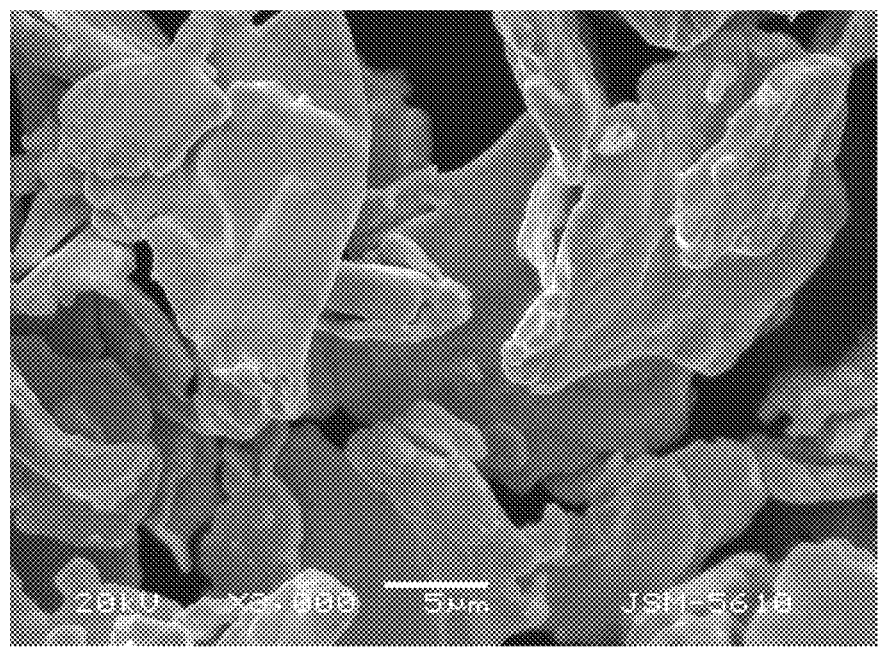
FIG. 4 shows the SEM picture (×3000 times) of the conventional composite Tantalum powder obtained in Comparative Example 1.

As seen from FIGS. 3 and 4, the product is composed of a flaked tantalum powder, the pure flaked tantalum powder prepared by a conventional process exhibits a serious lamination phenomenon. Particularly, as seen from FIG. 3, when a capacitor is manufactured, these flakes are ready to contract together due to high temperature sintering, so that the extraction effect of the capacitance is reduced, thereby to easily result in a higher leakage current, loss, and contraction ratio, and a reduced breakdown voltage.

The description and examples of the invention as disclosed herein are illustrative. Furthermore, it is obvious for a person skilled in the art that the invention may involve other embodiments, and the essential scope and spirit of the invention depend on the claims.

The invention claimed is:

1. A process for preparing a composite tantalum powder, comprising the following steps of:
   1) providing a tantalum powder prepared by a sodium reduction process, and flattening the tantalum powder so as to prepare a flaked tantalum powder;
   2) providing a granular tantalum powder prepared by hydrogenating tantalum ingot and having a different chemical composition than the flaked tantalum powder;
   3) mixing the flaked tantalum powder and the granular tantalum powder to give a tantalum powder mixture; and
   4) thermally treating the tantalum powder mixture, and then pulverizing, and screening the mixture to give a composite tantalum powder, wherein the flaked tantalum powder and the granular tantalum powder are mixed in a ratio of 5:2 to 8:5 flaked tantalum powder: granular tantalum powder, and
   wherein the flaked tantalum powder and the granular tantalum powder are interlaced with each other in the microstructure of the composite tantalum powder produced after step 4).

2. The method according to claim 1, further comprising subjecting the flaked tantalum powder to a first thermal treatment to under vacuum before the step 3), and crushing, screening and magnetic separation.

3. The method according to claim 2, after the magnetic separation, further comprising a pre-agglomeration and a second thermal treatment, then subjecting the flaked tantalum powder to crushing, screening and deoxygenation, and following this, subjecting the flaked tantalum powder to acid washing and baking.

4. The method according to claim 1, further comprising, before step 3), subjecting the granular tantalum powder to acid washing, and baking and screening.

5. The method according to claim 4, further comprising, after the screening, a first thermal treatment to the tantalum powder, and then crushing, screening and magnetic separation.

6. The method according to claim 5, after the magnetic separation, further comprising a second thermal treatment, screening and magnetic separation to the tantalum powder, and then deoxygenation, acid washing and baking.

\* \* \* \* \*